US012750529B2

(12) United States Patent
Hinds et al.

(10) Patent No.: US 12,750,529 B2
(45) Date of Patent: Sep. 29, 2026

(54) SUPPLEMENTAL ENHANCEMENT INFORMATION (SEI) MESSAGE FOR FILM GRAIN SYNTHESIS EXTENSION

(71) Applicant: Tencent America LLC, Palo Alto, CA (US)

(72) Inventors: Arianne Hinds, Palo Alto, CA (US); Stephan Wenger, Hillsborough, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 19/013,978

(22) Filed: Jan. 8, 2025

(65) Prior Publication Data

US 2025/0227304 A1 Jul. 10, 2025

Related U.S. Application Data

(60) Provisional application No. 63/619,304, filed on Jan. 9, 2024.

(51) Int. Cl.

| | |
|---|---|
| ***H04N 19/70*** | (2014.01) |
| ***G06T 9/00*** | (2006.01) |
| ***H04N 19/132*** | (2014.01) |
| ***H04N 19/167*** | (2014.01) |
| ***H04N 19/172*** | (2014.01) |

(52) U.S. Cl.

CPC ............... *H04N 19/70* (2014.11); *G06T 9/00* (2013.01); *H04N 19/132* (2014.11); *H04N 19/167* (2014.11); *H04N 19/172* (2014.11)

(58) Field of Classification Search

None

See application file for complete search history.

(56) References Cited

U.S. PATENT DOCUMENTS

2024/0323453 A1* 9/2024 Radosavljevic ....... H04N 19/85

FOREIGN PATENT DOCUMENTS

EP 4300477 A1 * 1/2024 ............ G09G 5/026
WO 2024/213679 A1 10/2024

OTHER PUBLICATIONS

International Search Report and Written Opinion for International Application No. PCT/US2025/010991 mailed on Mar. 27, 2025, 12 pages.

* cited by examiner

*Primary Examiner* — Rebecca A Volentine
(74) *Attorney, Agent, or Firm* — ArentFox Schiff LLP

(57) ABSTRACT

A method of video decoding includes reconstructing a coded picture including at least a first sample. The coded picture is associated with a Supplemental Enhancement Information (SEI) message for a film grain synthesis process to be applied to the reconstructed picture. The SEI message for the film grain synthesis process includes a syntax element indicating that alpha channel information is used in the film grain synthesis process. The method of video decoding includes applying the film grain synthesis process to the first sample based at least on the alpha channel information.

20 Claims, 14 Drawing Sheets

801

8.23.2 Alpha channel information SEI message semantics

The alpha channel information (ACI) SEI message provides information about alpha channel sample values and post-processing applied to the decoded alpha planes coded in auxiliary pictures of type AUX_ALPHA and one or more associated primary pictures.

802

[…]

alpha_channel_use_idc equal to 0 indicates that for alpha blending purposes the decoded samples of the associated primary picture should be multiplied by the interpretation sample values of the decoded auxiliary picture in the display process after output from the decoding process. alpha_channel_use_idc equal to 1 indicates that for alpha blending purposes the decoded samples of the associated primary picture should not be multiplied by the interpretation sample values of the decoded auxiliary picture in the display process after output from the decoding process. alpha_channel_use_idc equal to 2 indicates that the usage of the auxiliary picture is unspecified. alpha_channel_use_idc equal to 3 indicates that the simulated film grain value at the same position and colour component samples should be multiplied by the interpretation sample values of the decoded auxiliary picture prior to calculating the film grain values. Values greater than 3 for alpha_channel_use_idc are reserved for future use by ITU-T | ISO/IEC. When not present, the value of alpha_channel_use_idc is inferred to be equal to 2. Decoders shall ignore alpha channel information SEI messages in which alpha_channel_use_idc is greater than 3.

803

FIG. 8

901 If the current PU contains an ACI SEI message (as defined in clause 8.23.2) with alpha_channel_use_idc equal to 3, the simulated film grain values are weighted by the auxiliary data as follows:

903 – If fg_blending_mode_id. as defined in the active FGC SEI message, is equal to 0, the blending mode is additive as specified by:
(grain[ c ][ x ][ y Clip3( 0, ( 1 << fgBitDepth[ c ) - 1, I[ c ][ x ][ y + G[ c ][x ][ y ]* Iaux[ c ][ x ][ y ])

904 – Otherwise (fg_blending_mode_id of the active FGC SEI message is equal to 1), the blending mode is multiplicative as specified by:
Igrain[ c ][ x ][ y ] = Clip3( 0, ( 1 << fgBitDepth[ c ] ) - 1, I[ c ][ x ][ y ] + Round( ( i[ c ][ x][y ] * G[ c ][ x ][ y ]* Iaux[c ][ x ][ y]) ) ( ( 1 << fgBitDepth[ c])-1)))

902 where 1[ c ][ x ][ y ] represents the sample value at coordinates x, y of the colour component c of the input image 1, G[ c ][ x ][ y ] is the simulated film grain value at the same position and colour component, and fgBitDepth[ c ], as defined in the active FGC SEI message, is the number of bits used for each sample in a fixed-length unsigned binary representation of the arrays Igrain[ cx ][ y ], 1[ c ][ x ][ y ], and G[ c ][ x ][ y ], where c = 0..2, x = 0..PicWidthInLumaSamples - 1, and y = 0.. PicHeightinLumaSamples — 1, and where Iaux[ c x ][ y represents the sample value at coordinates x, y of the colour component c of the decoded auxiliary picture.

FIG. 9

1100

| | | |
|---|---|---|
| | film_grain_extension( payloadSize ) { | **Descriptor** |
| 1101 | **fge_cancel_flag** | u(1) |
| | if( !fge_cancel_flag ) { | |
| 1102 | **fge_spatial adaptation_information_present_flag** | u(1) |
| | if( fge_spatial_adaptation_information_present_flag ) { | |
| 1103 | **fge_region_based_adaptation_flag** | u(1) |
| | if( fge_region_based_adaptation_flag ) { | |
| 1104 | **fge_default_grain_enabled** | u(1) |
| 1105 | **fge_active_regions_number** | u(4) |
| | for( i = 0; i < **fge_active_regions_number**; i++ ) { | |
| 1106 | **fge_ar_bounding_box_top**[ i ] | u(16) |
| 1107 | **fge_ar_bounding_box_left**[ i ] | u(16) |
| 1108 | **fge_ar_bounding_box_width**[ i ] | u(16) |
| 1109 | **fge_ar_bounding_box_height**[ i ] | u(16) |
| 1110 | **fge_film_grain_enabled_flag**[ i ] | u(1) |
| | } | |
| | } | |
| 1111 | **fge_alpha_channel_adaptation_flag** | u(1) |
| | } | |
| 1112 | **fge _persistence_flag** | u(1) |
| | } | |
| | } | |

FIG. 11

SUPPLEMENTAL ENHANCEMENT INFORMATION (SEI) MESSAGE FOR FILM GRAIN SYNTHESIS EXTENSION

RELATED APPLICATION

The present application claims the benefit of priority to U.S. Provisional Application No. 63/619,304, "Supplemental Enhancement Information (SEI) Message for Film Grain Synthesis Extension" filed on Jan. 9, 2024, which is incorporated by reference herein in its entirety.

TECHNICAL FIELD

The present disclosure describes aspects generally related to video coding, including supplemental enhancement information (SEI) messages.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding/encoding includes processing circuitry.

A method of video decoding includes reconstructing a coded picture including at least a first sample. The coded picture is associated with a Supplemental Enhancement Information (SEI) message for a film grain synthesis process to be applied to the reconstructed picture. The SEI message for the film grain synthesis process includes a syntax element indicating that alpha channel information is used in the film grain synthesis process. The method of video decoding includes applying the film grain synthesis process to the first sample based at least on the alpha channel information.

A method of video encoding includes encoding a picture that includes at least a first sample in a video bitstream and encoding a supplemental enhancement information (SEI) message for a film grain synthesis process to be applied to the picture. The SEI message for the film grain synthesis process includes a syntax element indicating that alpha channel information is used in the film grain synthesis process. The SEI message indicates that the film grain synthesis process is to be applied to the first sample based at least on the alpha channel information.

Some aspects of the disclosure provide a method of processing visual media data. The method includes processing a bitstream of visual media data according to a format rule. The bitstream includes coded information of a coded picture including at least a first sample. The coded picture is associated with a Supplemental Enhancement Information (SEI) message for a film grain synthesis process to be applied to the coded picture that is reconstructed. The SEI message for the film grain synthesis process includes a syntax element indicating that alpha channel information is used in the film grain synthesis process. The format rule specifies that the film grain synthesis process is applied to the first sample based at least on the alpha channel information.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 8 shows an example of semantics of an ACI SEI message according to an aspect of the disclosure.

FIG. 9 shows a portion of semantics of an SEI message according to an aspect of the disclosure.

FIG. 11 shows an example of a syntax that describes a SEI message according to an aspect of the disclosure.

DETAILED DESCRIPTION

Some aspects of the disclosure provide techniques of video coding (e.g., encoding and decoding). In some examples, the techniques are used in an SEI message indicating information for film grain synthesis.

Video coding techniques can compress video data. Video coding and decoding using inter-picture prediction with motion compensation has been used in various examples. In some examples, uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

Video coding techniques (e.g., encoding and decoding techniques) can reduce redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Video encoders and decoders can utilize techniques from several broad categories, including, for example, motion compensation, transform, quantization, and entropy coding, some of which will be introduced below.

Figure 1:
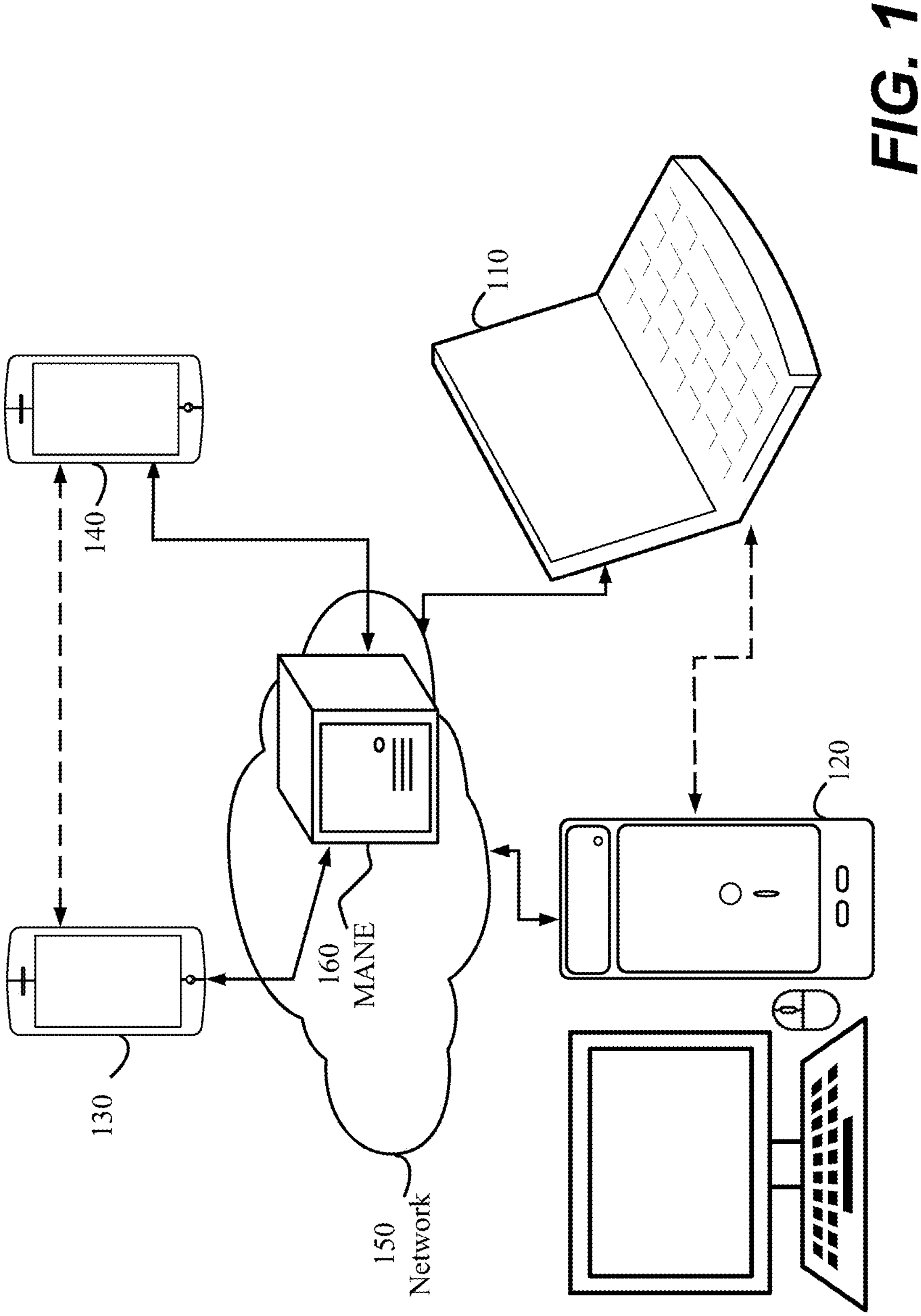
FIG. 1 shows a block diagram of a communication system in some examples.

FIG. 1 shows a block diagram of a communication system (100) in some examples. The system (100) includes at least two terminals, such as a first terminal (110) and a second terminal (120) shown in FIG. 1, that are interconnected via a network (150). In some examples, unidirectional transmission of data is performed in the communication system (100). In an example, for the unidirectional transmission of data, the first terminal (110) can code video data at a local location for transmission to the second terminal (120) via the network (150). The second terminal (120) can receive the coded video data of the other terminal, such as the first terminal (110), from the network (150), decode the coded data and display the recovered video data. It is noted that unidirectional data transmission can be commonly used in media serving applications and the like.

FIG. 1 also shows a second pair of terminals, such as a third terminal (130) and a fourth terminal (140), that are configured to support bidirectional transmission of coded video that may occur, for example, during videoconferencing. For bidirectional transmission of data, each of the third terminal (130) and the fourth terminal (140) can code video data captured at a local location for transmission to the other terminal via the network (150). Each of the third terminal (130) and the fourth terminal (140) can also receive the coded video data transmitted by the other terminal, can decode the coded data and display the recovered video data at a local display device.

It is noted that while in FIG. 1, the terminals (110), (120), (130) and (140) are illustrated as servers, personal computers and smart phones, but the present disclosure is not limited to such terminal examples. Embodiments of the present disclosure can include application with laptop computers, tablet computers, media players and/or dedicated video conferencing equipment. The network (150) represents any number of networks that convey coded video data among the terminals (110), (120), (130) and (140), including for example wireline and/or wireless communication networks. The network (150) can exchange data in circuit-switched and/or packet-switched channels. Representative networks include telecommunications networks, local area networks, wide area networks and/or the Internet. For the purposes of the present discussion, the architecture and topology of the network (150) can be immaterial to the operation of the present disclosure unless explained herein below. In some examples, the network (150) includes Media Aware Network Elements (MANEs, 160) that may be included in the transmission path between, for example, the third terminal (130) and fourth terminal (140). In some examples, a MANE (160) can selective forward of parts of the media data to react to network congestions, media switching, media mixing, archival, and similar tasks commonly performed by a service provider rather than an end user. Such MANEs may be able to parse and react on a limited part of the media conveyed over the network, for example syntax elements related to the network abstraction layer of video coding technologies or standards.

Figure 2:
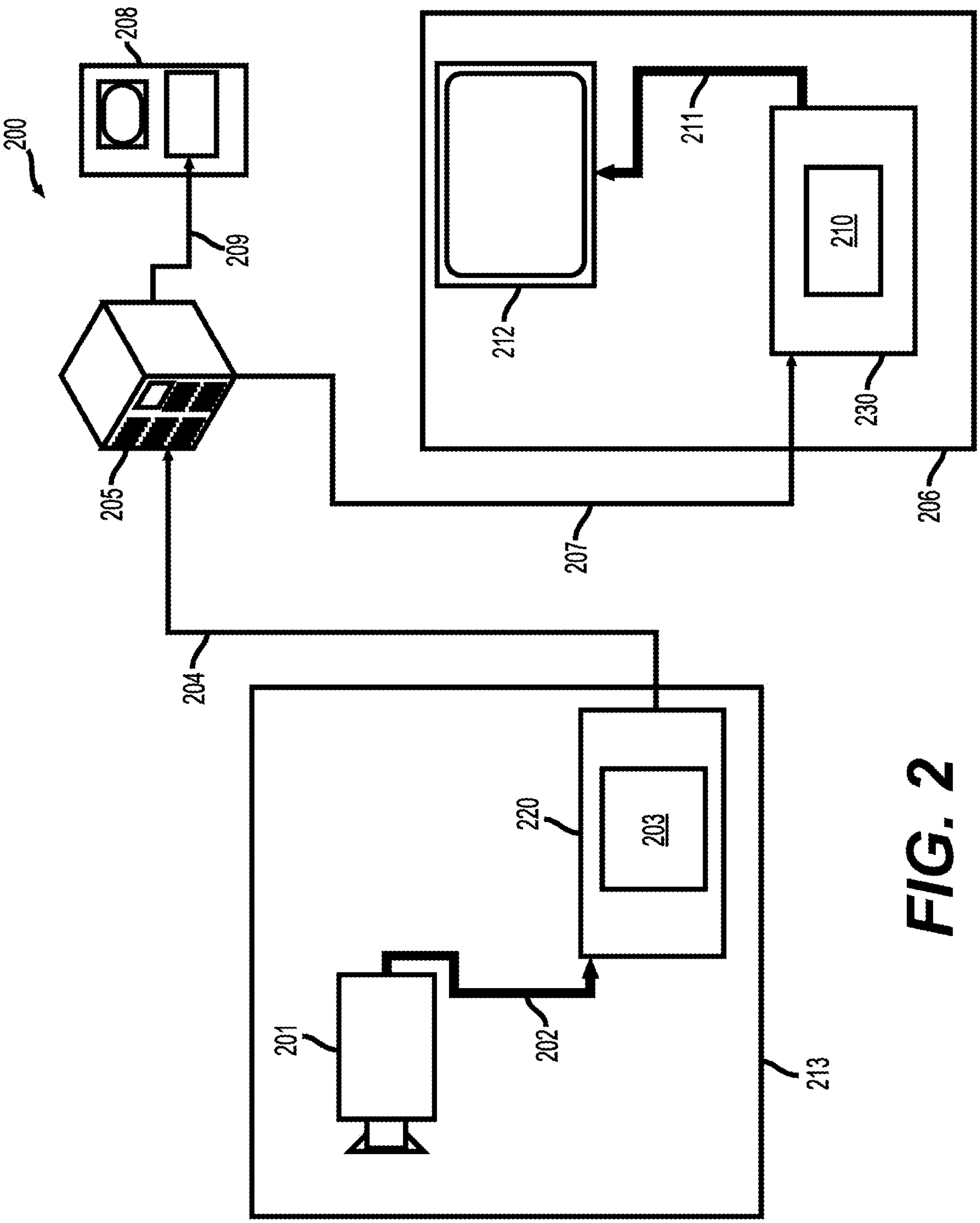
FIG. 2 shows a block diagram of a video processing system in some examples.

FIG. 2 shows a block diagram of a video processing system (200) in some examples. The video processing system (200) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (200) includes a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
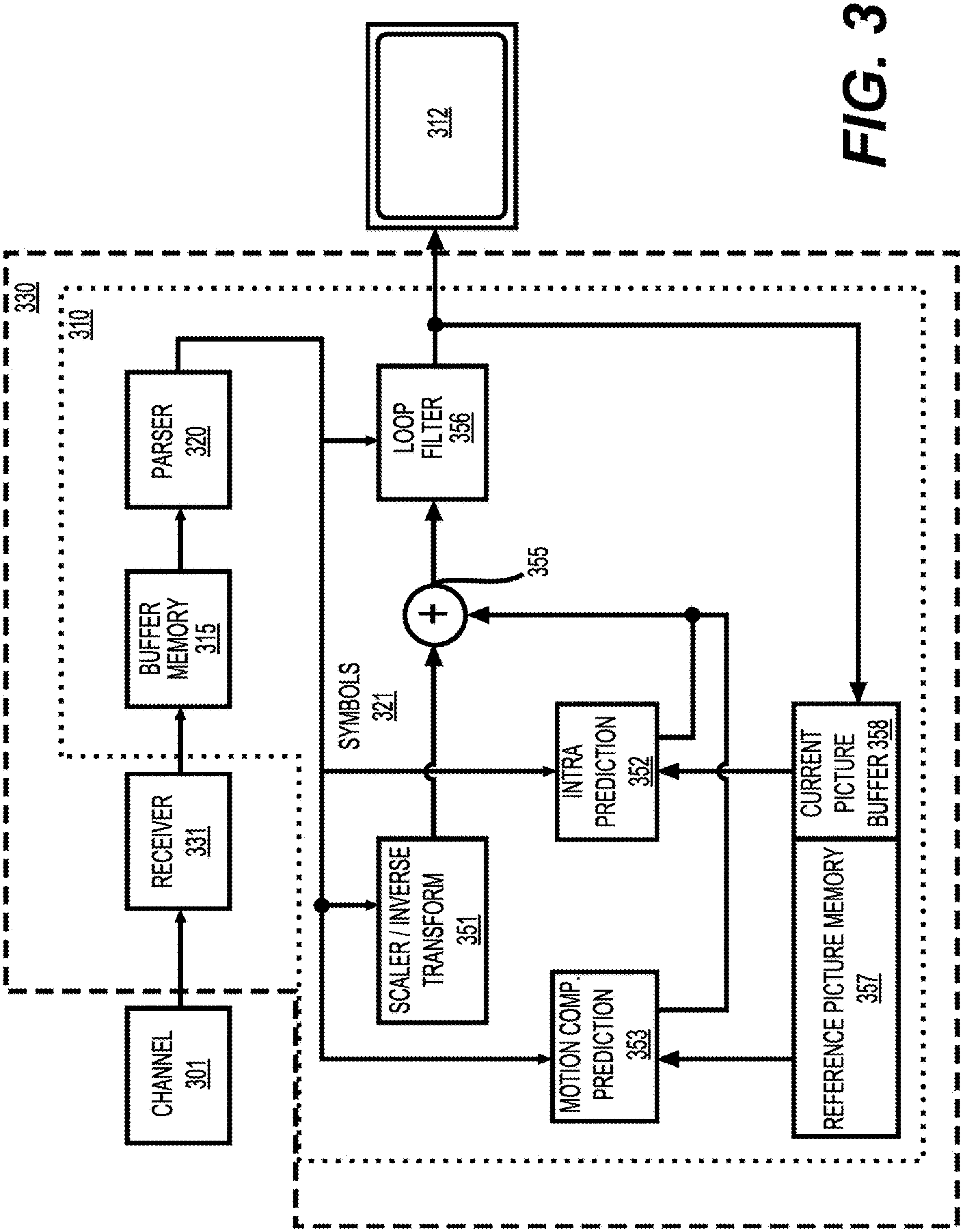
FIG. 3 shows an exemplary block diagram of a video decoder in some examples.

FIG. 3 shows an exemplary block diagram of a video decoder (310). The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) can receive one or more coded video sequences, included in a bitstream for example, to be decoded by the video decoder (310). In an aspect, one coded video sequence is received at a time, where the decoding of each coded video sequence is independent from the decoding of other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as shown in FIG. 3. The control information for the rendering device(s) may be in the form of Supplemental Enhancement Information (SEI) messages or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by subgroup control information parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform unit (351) can pertain to an intra coded block. The intra coded block is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated, block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320). Video compression can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
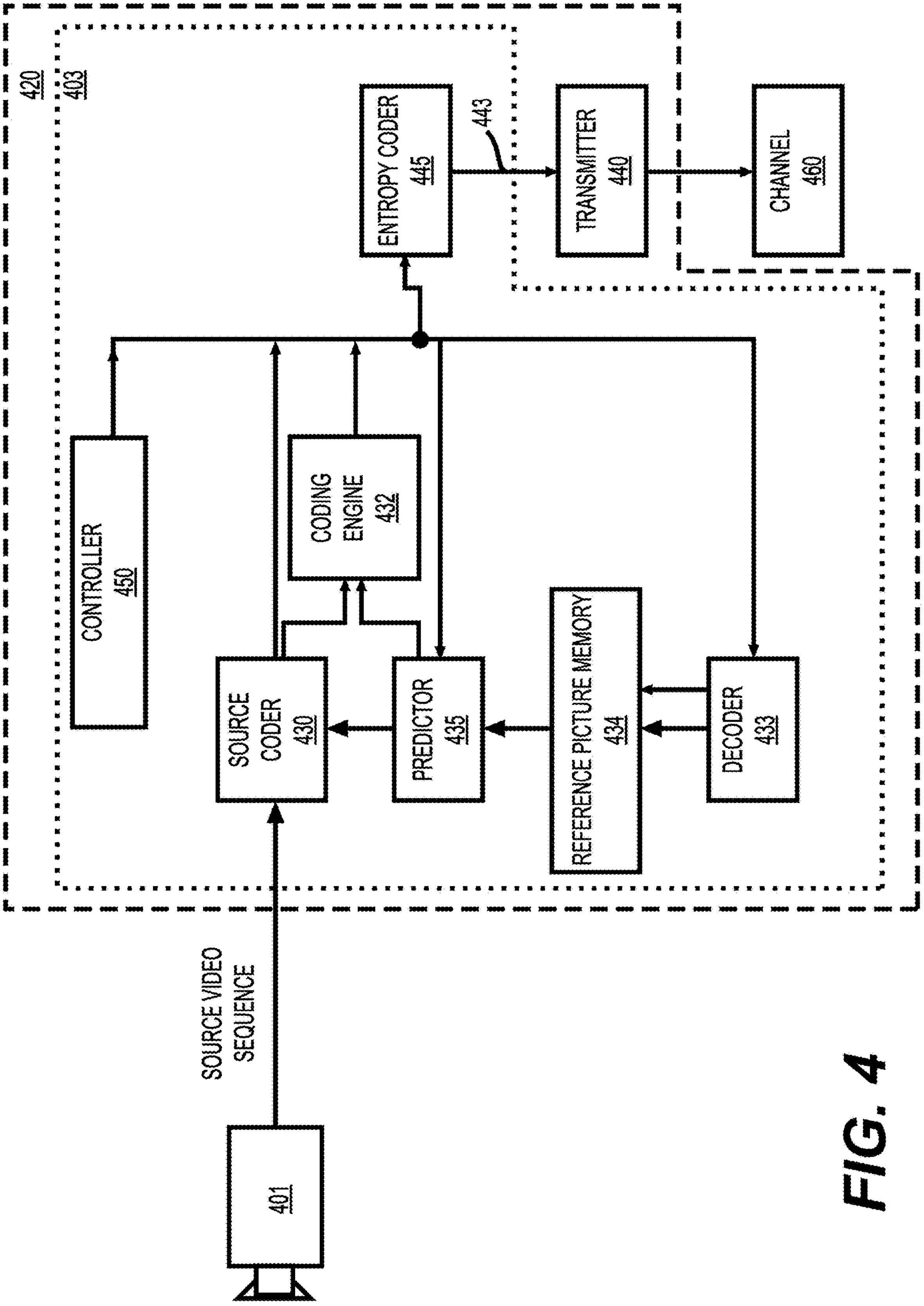
FIG. 4 shows a block diagram of a video encoder in some examples.

FIG. 4 shows an exemplary block diagram of a video encoder (403). The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (403) may code and compress the pictures of the source video sequence into a coded video sequence (443) in real time or under any other time constraints as required. Enforcing appropriate coding speed is one function of a controller (450). In some aspects, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some aspects, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create. The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture memory (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by applying lossless compression to the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video encoder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an aspect, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, supplementary enhancement information (SEI) messages, Visual Usability Information (VUI) parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (203) and (403), and the video decoders (210) and (310) can be implemented using any suitable technique. In an aspect, the video encoders (203) and (403) and the video decoders (210) and (310) can be implemented using one or more integrated circuits. In another aspect, the video encoders (203) and (403), and the video decoders (210) and (310) can be implemented using one or more processors that execute software instructions.

A video encoder and a video decoder may utilize techniques from multiple broad categories, including, for example, motion compensation, transform, quantization, entropy coding, carriage of supplemental information (e.g., metadata that may describe the imagery in a coded bitstream), and the like.

In an aspect, a compressed video and/or a picture may be augmented, in the video bitstream, by supplementary enhancement information, for example in the form of Supplementary Enhancement Information (SEI) Messages or VUI. In some examples, video coding standards can include specifications for SEI and VUI. In some examples, SEI and VUI information may also be specified in standalone specifications that may be referenced by the video coding specifications.

Technique used in video coding standards may include one or more SEI messages which may enable the carriage of information, for example, within the coded bitstream, that is supplemental to the coded video. Such SEI information may or may not be directly related to the video coding process, e.g., as specified by a video standard, e.g., H.264|AVC, H.265|HEVC, H.266|VVC, and/or the like. In many cases, the information in SEI message(s) may be relevant to application processes that are executed in tandem with, or closely following, a video decoding process. For example, such applications may include a rendering process that uses certain SEI messages to adjust brightness or a color space of decoded video frames (also referred to as pictures) prior to presentation by a display device.

In an aspect, within the current standards that utilize SEI messages, e.g., H.264|AVC, H.265|HEVC, and H.266|VVC, SEI messages may be separated into two classes: a first class that may impact a video decoding process, and a second class that does not impact the video decoding process, e.g., for external applications. SEI messages that do not impact the decoding process may be specified in a separate specification such as a specification entitled "Versatile supplemental enhancement information messages for coded video bitstreams" (VSEI). SEI messages that may affect the decoding process may be specified in a main coding specification such as "Versatile Video Coding."

The disclosure includes video coding and decoding, such as the application of film grain or similar noises to a part of a picture, controlled by metadata including metadata coded in a SEI message, such as a VSEI annotated region SEI message.

In an aspect, Film Grain Synthesis (FGS) is a tool aimed at maintaining an impression of an original film grain, for example, for content shot using chemical films (in contrast to digital cameras) in a digital, compressed video environment. Digitized input material may be pre-filtered, which may remove the film grain but may help the following encoding step to achieve better compression efficiency compared to input material that includes noise such as film grain. An artificial approximation of the film grain may be reinserted after reconstruction. An amount and characteristics of the noise can be part of a video bitstream, for example, in the form of metadata. ITU-T Rec. H.274, for example, includes a film grain characteristics (FGC) SEI message.

In an aspect, an Alpha Channel information (ACI) SEI message may be included, for example, in ITU Rec. H.274. The ACI SEI message may be used to define the application of alpha channel information that may be present in a bitstream, for example, a bitstream in accordance with H.266.

Techniques for a per-sample or per-region based application of Film Grain Synthesis using SEI messages are described in the disclosure.

In some examples, video signals may be composed from multiple sources. For example, a movie with commentary may be composed of the movie content, and a surrounding frame with the commentary. The movie may have been shot using chemical film technology and hence, after digitization, may include film grain. To achieve reasonable compression, the film grain of the movie can be removed through pre-filtering. The surrounding frame may have been created by digital means and does not include film grain. After coding, transmission, and reconstruction, the resulting reconstructed pictures do not include the noise associated with the film grain of the movie, which may be for the surrounding frame and in some examples may not be for the movie as the film grain of the movie was removed through pre-filtering. Therefore, a technique in which film grain can be selectively inserted in parts of a reconstructed picture while leaving non-selected parts of the reconstructed picture free of film grain may be used. A more complex scenario may involve the inclusion of multiple movies with different film grain characteristics in a composed picture. In such a scenario, different film grain reinsertion parameters may advantageously be applied to different parts of the reconstructed picture, respectively.

Figure 5:
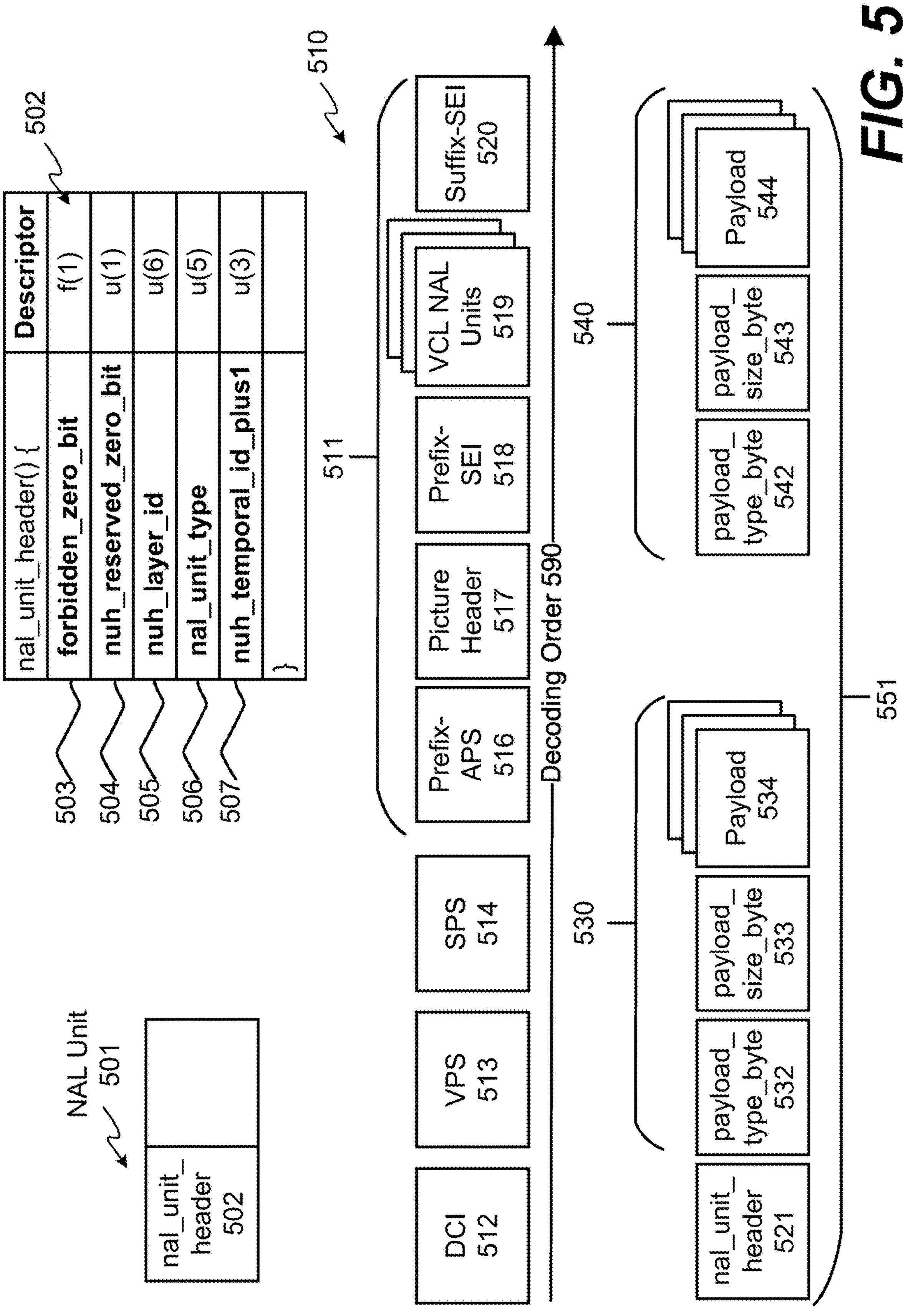
FIG. 5 shows a layout of a coded video sequence (CVS) in some examples.

FIG. 5 shows a layout of a coded video sequence (CVS) in some examples, such as in accordance with H.266. The coded video sequence is subdivided into network abstraction layer (NAL) units (NAL units), such as an NAL unit (501) in FIG. 5. In the FIG. 5 example, the NAL unit (501) can include a NAL unit header (502). In some examples, the NAL unit header (502) includes 16 bits. In the FIG. 5 example, the NAL unit header (502) includes a first bit (e.g., a forbidden_zero_bit) (503) and a second bit (e.g., a nuh_reserved_zero_bit) (504). In an example, the first bit and the second bit are unused by H.266 and may be set to zero in a NAL unit compliant with H.266.

In the FIG. 5 example, the NAL unit header (502) includes a syntax element nuh_layer_id (505) having multiple bits (e.g., six bits). In an example, three bits of nuh_layer_id (505) may be indicative of the (spatial, SNR, or multiview enhancement) layer to which the NAL unit (501) belongs to. The NAL unit header (502) includes five bits of nuh_nal_unit_type (506) that define the type of the NAL unit (501). In some examples (e.g., H.266), among the 32 values represented by the five bits, 22 NAL unit type values are defined for NAL unit types, six NAL unit types are reserved, and four NAL unit type values are unspecified and can be used by specifications other than H.266. The NAL unit header (502) includes three bits of nuh_temporal_id_plus1 (507) to indicate the temporal layer to which the NAL unit (501) belongs to.

NAL units may be classified into video coding layer (VCL) NAL units and non-VCL NAL units. The VCL NAL units may include data that represents values of samples in video pictures, and the non-VCL NAL units may contain associated additional information such as one or more parameter sets, SEI, and/or the like.

In some examples, a coded picture can include one or more VCL NAL units and zero or more non-VCL NAL units. VCL NAL units may contain coded data conceptually belonging to a video coding layer as introduced before. Non-VCL NAL units may contain data not conceptually belonging to the video coding layer. Using H.266 as an example, the non-VCL NAL units can be categorized into, for example, categories below:

(1) Parameter sets, which include information that can be used for the decoding process and can be applied to more than one coded picture. Parameter sets and conceptually similar NAL units may be of NAL unit types (NUTs), such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and remaining constant throughout a coded video sequence CVS), PPS_NUT (Picture Parameter Set (PPS), establishing, among other things, parameter used and remaining constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. The third category includes NAL units with the NAL unit types AUD_NUT (Access Unit Delimiter), EOS_NUT (End of Sequence), and EOB_NUT (End of Bitstream). The third category of NAL units are non-normative, also known as informative, in the sense that a compliant decoder does not require them for its decoding process. In an example, the compliant decoder may need to be able to receive them in the NAL unit stream.

(4) Prefix and Suffix SEI NAL unit types (PREFIX_SEI_NUT and SUFFIX_SEI_NUT) which indicate NAL units containing Prefix and Suffix supplementary enhancement information. In some examples (e.g., in H.266), the fourth category of NAL units are informative, as they are not required for the decoding process.

(5) Filler Data NAL unit type FD_NUT indicates filler data that can be random and can be used to "waste" bits in a NAL unit stream or bitstream, which may be necessary for the transport over certain isochronous transport environments.

(6) Reserved and Unspecified NAL unit types.

FIG. 5 also shows a layout of a NAL unit stream (510) in a decoding order (590) in some examples. The NAL unit stream (510) includes a coded picture (511). The NAL unit stream (510) includes, somewhere earlier than the coded picture (511), DCI (512), VPS (513), and SPS (514). DCI (512), VPS (513), and SPS (514) may, in combination, establish the parameters which the decoder can use to decode the coded pictures of a coded video sequence (CVS), including the coded picture (511) in the NAL unit stream (510).

In the FIG. 5 example, the coded picture (511) can include, in the depicted order or any other order compliant with the video coding technology or standard in use (such as H.266 shown in FIG. 5): a prefix APS (516), a picture header (PH) (617), prefix SEI (518), one or more VCL NAL units (519), and suffix SEI (520).

In some examples, the prefix SEI NAL units (518) and the suffix SEI NAL units (520) are configured during the standards development as, for some SEI messages, the content of the message may be known before the coding of a given picture commences, whereas in some examples other content may only be known when the picture has been coded. Allowing certain SEI messages to appear early or late in a coded picture's NAL unit stream through prefix and suffix SEIs may avoid buffering. For example, in an encoder, the sampling time of a picture to be coded is known before the picture is coded, and hence the picture timing SEI message can be the prefix SEI message (518). On the other hand, a decoded picture hash SEI message, which contains a hash of the sample values of a decoded pictures and can be useful, for example, to debug encoder implementations, is a suffix SEI message (520) as an encoder cannot calculate a hash over reconstructed samples before a picture has been coded. The locations of prefix and suffix SEI NAL units may not be restricted to their positions in the NAL unit stream. The phrase "prefix" and "suffix" may imply to what coded pictures or NAL units the prefix/suffix SEI message may pertain to, and the details of this applicability may be specified, for example in the semantics description of a given SEI message.

FIG. 5 also shows a diagram of a syntax of a NAL unit (551) that contains a prefix or suffix SEI message. The syntax is a container format for multiple SEI messages that can be carried in one NAL unit (also referred to as SEI NAL unit). Details of the emulation prevention syntax specified in H.266 are omitted here for clarity. As other NAL units, an SEI NAL unit may start with a NAL unit header (521). The NAL unit header (521) is followed by one or more SEI messages, such as a first SEI message (530) and a second SEI message (540) in FIG. 5. Each SEI message inside the NAL unit (551) may include an 8 bit payload_type_byte which specifies one of 256 different SEI types, such as shown by a payload_type_byte (532) and a payload_type_byte (542) in FIG. 5. Each SEI message inside the NAL unit (551) may include an 8 bit payload_size_byte which specifies a number of bytes of the SEI payload, such as shown by a payload_size_byte (533) and a payload_size_byte (543) in FIG. 5. Each SEI message inside the NAL unit (551) may include a SEI payload with the number of bytes specified by the payload_size_byte, such as a payload (534) and a payload (544) in FIG. 5. In some examples, the structure can be repeated until a payload_type_byte equal to 0xff is observed, which indicates the end of the NAL unit. The syntax of the payload may depend on the SEI message, and can be of any suitable length such as a length between 0 and 255 bytes.

Figure 6:
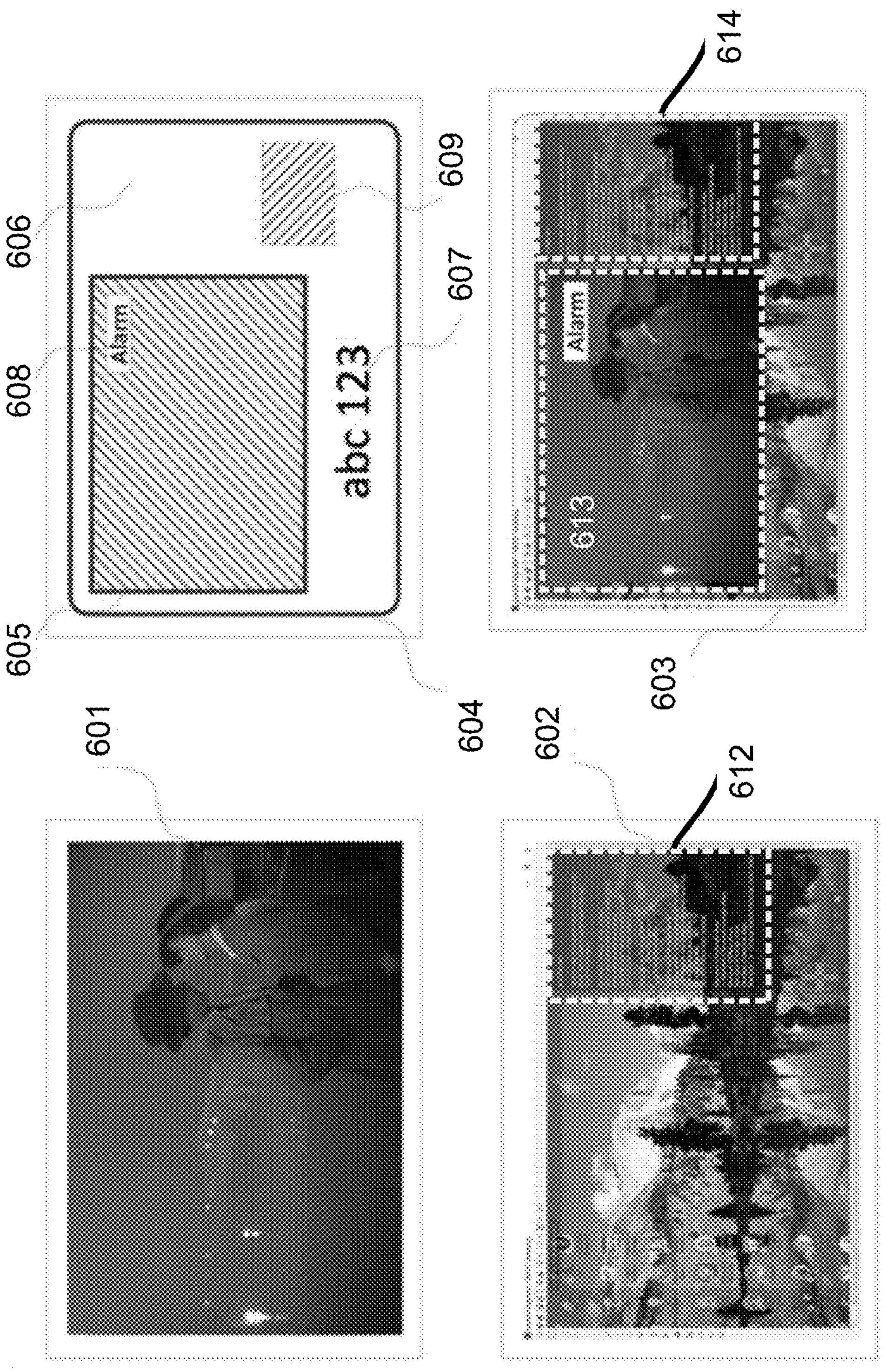
FIG. 6 shows an example of a video scene including a first content and a second content according to an aspect of the disclosure.

FIG. 6 shows an example of a video scene including a first content (e.g., a movie content) where film grain synthesis (FGS) may be desirable and a second content (e.g., a computer-generated content) where FGS may not be desirable according to an aspect of the disclosure. Referring to FIG. 6, an image (601) has the first content and a computer screen shot (602) has the second content. In an example, the image (601) is a still image taken from a black and white movie shot on a chemical film. Light conditions in the shot in the still image (601) are considered as unfavorable (e.g., a night shot) in some examples, and thus a relatively large amount of film grain is observable when watching the original film content. In some examples, it is desirable to reproduce the film grain as the film grain may be directly associated with the original content and may be a part of the original artistic expression. In contrast, the computer screen shot (602) may rely on sharp and noise-free information to represent, for example, small letters on the right sidebar that are within an area (612). In an example, in this use case associated with the computer screen shot (602), that the potentially noisy mountain scenery in the background of the computer screen shot (602) may be not faithfully represented is acceptable.

A screen layout (603) is an example of a hybrid of two contents (613) and (614). In an example, the two contents are in the same video stream. Parts of the two contents (613) and (614) may benefit from film grain, and other parts of the two contents (613) and (614) such as the letters on the right side bar may not benefit from the film grain. For example, the content (613) may be identical or similar to the image (601), and benefits from having film grain. The content (614) may be identical or similar to the computer screen shot (602), and may not benefit from having the film grain.

A screen shot (604) is shown in a conceptual representation without details. The screen shot (604) includes an area (605) that include movie images and a background (606). In an example, the background (606) is outside the area (605). The area (605) that include movie images may benefit from the reapplication of the film grain. The background (606) does not benefit from film grain. In an example, the background (606) includes areas with high spatial computer-generated details such as a string (607) that do not benefit from the film grain. In an example, a screen layout may include a window (e.g., labelled "Alarm") (608) that partially obscures the displayed movie in the area (605). In this example, whether to apply the FGS (or the FGS process) can be coded in a series of regions (such as rectangles), each with an indication of a strength of the FGS. For example, firstly, the whole screen (604) may be marked as not requiring the FGS, then the area (605) may be marked as requiring the FGS, and the "Alarm" string (608) may be marked as not requiring the FGS. Another window (609) (e.g., in the background (606)) may or may not require the film grain.

The areas such as the areas (605), (608), and (609) may be of any suitable shape(s). In an aspect, the areas (605), (608), and (609) are rectangular and hence may be representable by "regions" (e.g., rectangular regions) similar to an annotated regions SEI message as defined in, for example, the VSEI specification. In an example, such as in the VSEI specification, a region is defined by coordinates of a top-left corner sample, a width, and a height of the region. The geometry of a region may be restricted to a rectangle. In some scenarios, one or more of the areas (605), (608), and (609) may not be rectangular, and hence a per-sample based FGS (e.g., having an arbitrary shape) may be performed.

Referring back to FIG. 2, in an application scenario where the video source (or the content source) (201) in the capture subsystem (also referred to as a sending system) (213) is not an actual camera, but an image composer that puts together a video sequence (or the stream of video pictures) (202) that covers a scene comparable to what is shown as the composed scene (603). Thus, the signal presented to the encoder (203) is a composed scene where a part of the composed scene benefits from de-noising and film-grain identification and coding in the form of metadata such as one or more SEI messages, and other parts of the composed scene do not. Such an encoded stream may be conveyed as the encoded video data (204) and (207), for example, through the server (205) to the client subsystem (e.g., a receiving system) (206) and the decoder (210) located therein. The receiving system (206) can decode the metadata identifying samples where the FGS is to be applied (e.g., via film grain processing), and apply the FGS to the reconstructed bitstream (211), for example, through a post-processing step (not depicted in FIG. 2).

In some examples, a first mechanism may be used to identify (i) one or more regions such as one or more rectangular regions and/or (ii) one or more samples that may define a region having a more complex shape than, for example, rectangles of a reconstructed coded picture to which film-grain processing (or the FGS process) is to be applied. In an example, the one or more regions overlap. In an example, the one or more regions do not overlap.

In some examples, a second mechanism to describe the film grain characteristics may be used.

In some examples, a third mechanism to bind together the first mechanism and the second mechanism described above may be used. In an example, for a region where the FGS is to be applied, the appropriate film grain characteristics (including not using the FGS or no film grain characteristics) can be applied. In an example, for one or more samples where the FGS is to be applied, the appropriate film grain characteristics (including not using the FGS or no film grain characteristics) can be applied. Thus, film grain can be synthesized in a post-processing step according to a region-based or a sample-based designation.

In an aspect, with regard to the first mechanism, an alpha map can be a reconstructed picture with a single plane. The alpha map can serve, for example, as a Boolean or an integer value for each corresponding sample of the reconstructed picture. In an example, the alpha plane or the alpha map can have the same spatial dimension as the reconstructed picture. In another example, the alpha plane (or the alpha map) and the reconstructed picture can have different sizes. For example, the alpha map or the alpha map may be upscaled or downscaled to map each sample of the reconstructed picture to a sample (or a filtered composite of multiple samples) of the alpha plane.

In an aspect, with regard to the second mechanism, the VSEI specifies a film grain SEI message (e.g., a film grain characteristic SEI message) and similar information can be available in the VUI of video coding specifications. Multiple film grain SEI messages may be in a picture unit (PU), and an order of appearance of the multiple film grain SEI messages in the bitstream may be used by a decoder/receiver (e.g., the decoder (210)) to associate a given one of the multiple film grain SEI messages with one of the regions defined in a region such as an annotated region (AR).

In an aspect, with regard to the third mechanism, the one or more film grain SEI messages described in the second mechanism and the regions described in the first mechanism may be bounded to associate film grain characteristics conveyed by a given film grain SEI message with a region as described in the first mechanism.

Figure 7:
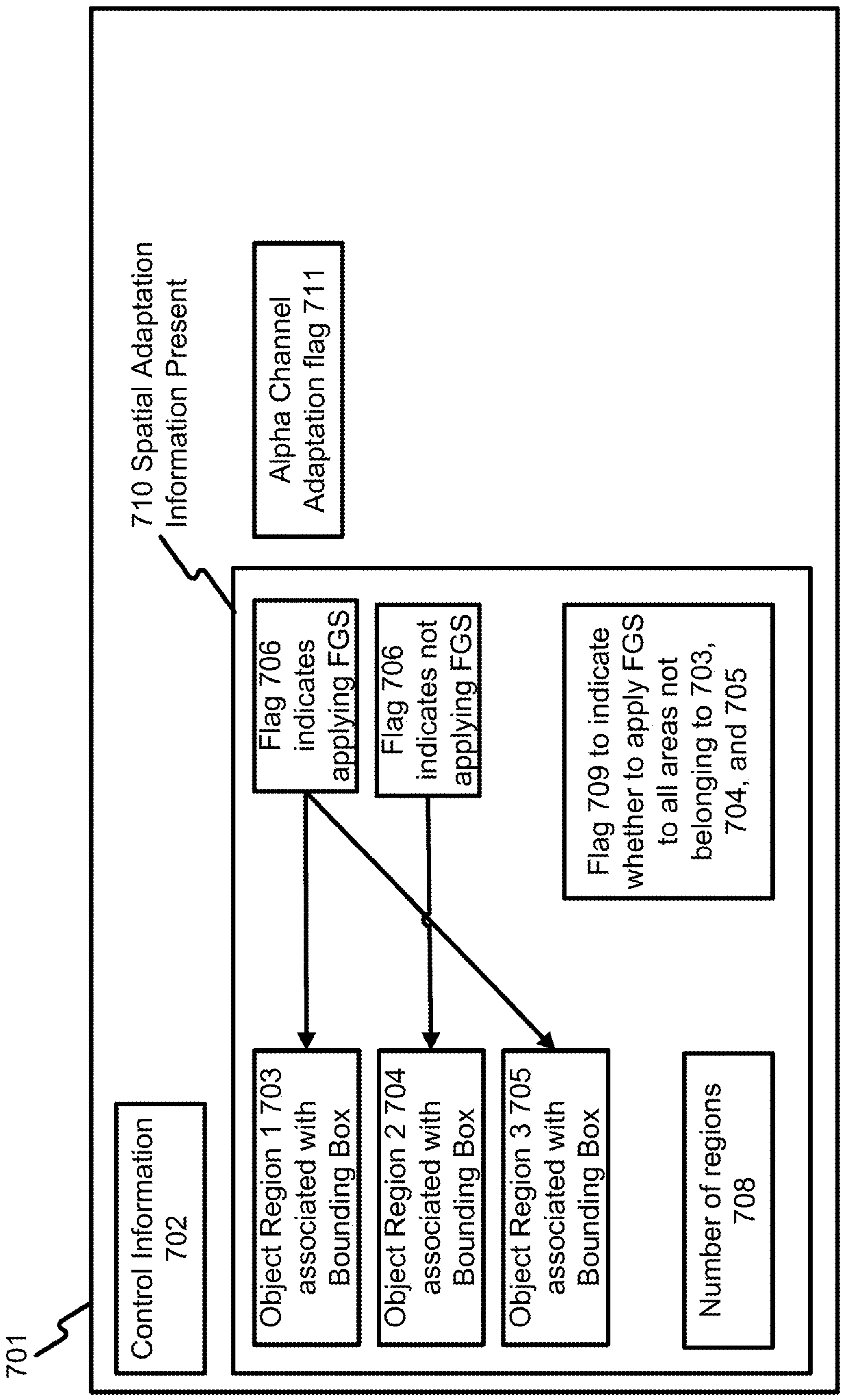
FIG. 7 shows an example of a SEI message according to an aspect of the disclosure.

FIG. 7 shows an example of a SEI message (701) according to an aspect of the disclosure. Referring to FIG. 7, the SEI message (701) is for an FGS process. In an example, the SEI message (701) may be referred to as an FGS extension SEI message as the SEI message (701) may extend an active film grain characteristics SEI message.

In an example, the FGS extension SEI message (701) may define control information and other information (e.g., other spatial information) related to the regions described in the first mechanism to which an FGS that is currently active for a picture may be applied. The picture may be associated with the SEI message (701), and in some examples, the picture is a reconstructed picture. Referring to FIG. 7, control information (702) may define the persistence of the current FGS extension SEI message (701). A flag (710) may signal if region information (e.g., rectangular region information) is present. A sample-based region flag (e.g., an alpha channel adaptation flag) (711) may signal that an active Alpha Channel Information (ACI) SEI message is to be used to determine sample-based regions in which to apply the FGS (or the FGS process).

Referring to FIG. 7, the SEI message (701) may include a syntax element (708) indicating a number of one or more regions that are active for the region-based application of the FGS. In the example shown in FIG. 7, the one or more regions include object regions 1-3. For the one or more regions defined by rectangles, the object region 1 (703) may define a bounding box for an area of the picture, the object region 2 (704) may define a bounding box for an area of the picture, and the object region 3 (705) may define a bounding box for an area of the picture. Each of the regions (e.g., (703), (704), and (705)) may be accompanied by a flag (706) to indicate whether to apply the FGS or not to the respective region. A separate flag (709) may indicate whether to apply (or not apply) the FGS to areas not defined by the regions (703)-(705).

In an aspect, an alpha map may be used to indicate whether the FGS process (or film grain processing) may be applied to a spatially corresponding sample of the reconstructed picture. In an example, sample values of the alpha plane are 10-bit integers with a value range from 0 to 1023 such as used in H.266. In an example, alpha plane values below 512 indicate that the FGS is not to be applied, and alpha plane values above 511 may indicate that the FGS is to be applied. The alpha map described above may be compressed efficiently, for example, the alpha map is compressed into a relatively small number of bytes for scenarios such as the one associated with the picture layout (603).

In an aspect, an alpha map may follow similar design principles as described above, however, may include integer values instead of integer-coded Boolean values. A value of the integer can, for each sample, indicate a strength of the application of the FGS.

Referring to FIG. 7, in an aspect, the alpha map may be indicated or identified by the flag (711), and the alpha map may be used to indicate (i) the use of the FGS or (ii) a strength of the FGS on a per-sample basis.

An alpha channel information (ACI) SEI message such as the ACI SEI message specified in the H.274 may provide information about alpha channel sample values and post processing applied to the decoded alpha planes coded in auxiliary pictures of type AUX_ALPHA and one or more associated primary pictures. In the context of the FGS processing, one of the one or more associated primary pictures is the reconstructed picture, and one of the auxiliary pictures of type AUX_ALPHA is the alpha map.

In an example, to identify the alpha map via the flag (711), the ACI SEI message such as specified in the H.274 may be modified as follows:

1. the syntax of the ACI SEI message remains unchanged.
2. In the semantics of the ACI SEI message, a paragraph may be inserted as shown in FIG. 8 to introduce (e.g., define) a previously reserved value of "3" and associate the value "3" with the use of the alpha map for the FGS.

FIG. 8 shows an example of semantics of the modified ACI SEI message (801) according to an aspect of the disclosure. In an example, certain parts (802) are omitted from the semantics of the modified ACI SEI message (801) for the purposes of brevity. Underlined text in FIG. 8 indicates added and/or modified content, for example, with regard to the published H.274 specification. More specifically, a new value "3" for a syntax element alpha_channel_use_idc is introduced to modify the semantics of the ACI SEI message (801). Its semantics are that, when found, the sample values in the reconstructed auxiliary picture (also referred to as the alpha map in this context) are used for the FGS. In an example, alpha_channel_use_idc being equal to 3 indicates that the simulated film grain value at the same position and color component samples may be multiplied by samples values (e.g., the interpretation sample values) of the decoded auxiliary picture (i.e., the alpha map) prior to calculating the film grain values.

Further, in the semantics of the FGS Extension SEI message, a paragraph is defined as shown in FIG. 9 that modifies the FGS blending based on alpha channel information. FIG. 9 shows a portion of semantics of an SEI message (e.g., the FGS extension SEI message shown in FIG. 7) to apply the FGS on a per-sample basis using a modified ACI SEI message according to an aspect of the disclosure. The semantics shown in FIG. 9 may be associated with the application of the film grain synthesis as described in the SEI message for the FGS, such as the film grain characteristics SEI message in the published H.274 specification or another SEI message. If the current picture unit (PU) includes an Alpha Channel Control indication with a newly defined value of "3" as indicated in a paragraph (901), then the film grain synthesis blending equations change so that the alpha channel sample value Iaux [c][x][y] (902) is factored in an additive mode (e.g., the blending mode is additive) as indicated in a paragraph (903) or in a multiplicative mode (e.g., the blending mode is multiplicative) as indicated in a paragraph (904). Iaux [c][x][y] refers to the alpha channel sample value at a coordinate indicated by [x] and [y], and for a color component indicated by [c].

Figure 10:
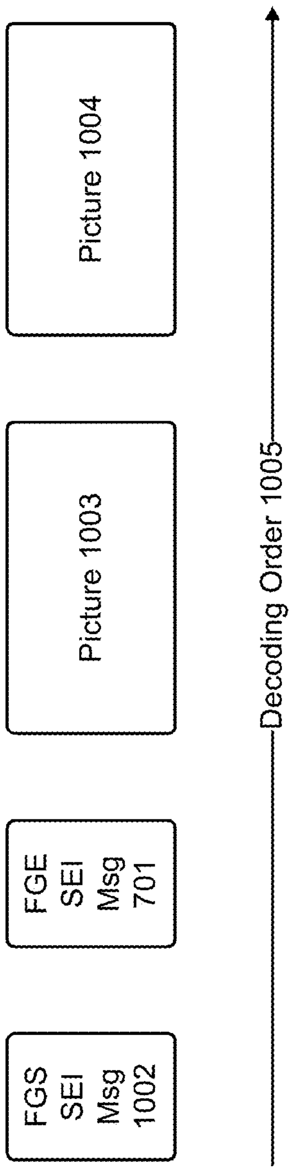
FIG. 10 shows a video stream that employs multiple SEI messages for an FGS process according to an aspect of the disclosure.

FIG. 10 shows a video stream (or a video bitstream) that employs multiple (e.g., two) SEI messages for an FGS process according to an aspect of the disclosure. In an example, the two SEI messages for the FGS process include a first SEI message (e.g., an FGS SEI message) (1002) and a second SEI message (e.g., the FGS extension SEI message (701) as described in FIG. 7). Referring to FIG. 10, the video bitstream may include the FGS SEI message (1002), and the FGS extension SEI message (701) in, for example, a decoding order (1005). The term "bitstream" or "video bitstream" may refer to one or more coded pictures or picture units (PUs), such as a CVS. In an example, the term bitstream may have a scope of only a single picture even if it implies resending the same SEIs with every picture in a sequence. Doing so may be an option as both the FGS SEI message (1002) and the FGS extension SEI message (701) may be compared to a coded picture of a quality that makes the use of the FGS desirable.

In an example, the two SEI messages are followed by the NAL units that make up the content of the coded pictures. Two pictures (1003) and (1004) are shown in FIG. 10. The two pictures (1003) and (1004) can be in scope of the FGS SEI message (1002) and the FGS extension SEI message (701) that precede the two pictures (1003) and (1004).

The FGS SEI message (1002) may be coded using the H.274 Film grain characteristics SEI syntax and semantics. For example, the FGS SEI message (1002) is the film grain characteristics SEI message as specified in H.274.

In another example (not shown in FIG. 10), a video stream may employ a single SEI messages for an FGS process. In an example, the single SEI message for the FGS process include syntax elements in the first SEI message (1002) and the second SEI message (e.g., the FGS extension SEI message (701) as described in FIG. 7).

FIG. 11 shows an example of a syntax (1100) that describes the second SEI message (e.g., the FGS extension SEI message) (701) according to an aspect of the disclosure. In an example, the second SEI message (e.g., the FGS extension SEI message) (701) is associated with the reconstructed picture. A cancel flag (e.g., a fge_cancel_flag) (1101) in the syntax (1100) can be used to disable the persistence of a previously processed SEI message (e.g., a previously processed FGS extension SEI message). If the cancel flag (1101) is set to a value indicating 'true', processing of the current FGS extension SEI message may be completed. Otherwise, if the cancel flag (1101) indicates that processing is to continue, for example, the cancel flag (1101) is set to a value indicating 'false', a flag (e.g., a fge_spatial_adaptation_information_present_flag) (1102) may receive a value to indicate if adaptation information for a region-based application or a sample-based application of the FGS is enabled. If the flag (1102) indicates that the adaptation information for the region-based application or the sample-based application of the FGS is enabled, then a flag (e.g., a fge_region_based_adaptation_flag) (1103) receives a value to indicate whether the region-based application of the FGS is enabled.

If the flag (1103) indicates that the region-based application of the FGS is enabled, then a syntax element (e.g., a fge_default_grain_enabled) (1104) receives a value to indicate whether areas not covered by regions defined in the SEI message (701) are to be modified by the application of the FGS. If the flag (1103) indicates that the region-based application of the FGS is enabled, a number (e.g., a fge_active_regions_number) (1105) receives a value indicating a number of the regions that are active for the region-based application of the FGS. For each active region (an i-th region in the picture being indicated by an index [i]) as indicated by the number (1105), the following indexed variables may be received: a variable (e.g., fge_ar_bounding_box_top [i]) (1106), a variable (e.g., fge_ar_bounding_box_left [i]) (1107), a variable (e.g., fge_ar_bounding_box_width [i]) (1108), a variable (e.g., fge_ar_bounding_box_height [i]) (1109), and a flag or a variable (e.g., fge_file_grain_enabled flag [i]) (1110). The indexed variables (1106)-(1109) may specify coordinates of a top-left corner, a width, and a height, respectively, of a bounding box of an i-th region in the picture. In an example, the variable (1106) signals the coordinates of the top right corner. In an example, the variable (1107) signals the coordinates of the bottom left corner. In an example, the variable (1108) signals the width, and the variable (1109) signals the height of the bounding box for the rectangular region (e.g., the i-th region) within the picture. The variable (1110) may signal whether to apply the FGS to the region (e.g., the i-th region) within the picture. The variable (1110) may or may not enable the application of the FGS to sample values that occur in the bounding box regions that overlap.

In an example, an alpha channel information flag (e.g., fge_alpha_channel_adaptation_flag) (1111) is included in the syntax (1100). In an example, the alpha channel information flag (e.g., fge_alpha_channel_adaptation_flag) (1111) follows the above described processing for the region-based FGS. The alpha channel information flag (e.g., fge_alpha_channel_adaptation_flag) (1111) may receive a value to indicate if the application of the FGS is to be weighted by an ACI SEI message if the ACI SEI message is currently active for the picture.

In an example, processing of the film grain extension is completed by a flag (e.g., fge_persistence_flag) (1112). The flag (1112) may receive a value that signals a range by which the current film grain extension SEI message (701) persists.

In an example (not shown in FIG. 11), the syntax (1100) may include additional syntax elements, for example, syntax elements for the FGS process, such as syntax elements in the first SEI message (1002) (e.g., the film grain characteristics SEI message as specified in H.274).

According to an aspect of the disclosure, a coded picture (e.g., the picture associated with the SEI message (701)) including at least a first sample may be reconstructed. The coded picture may be associated with a SEI message (e.g., the SEI message (701)) for an FGS process to be applied to the reconstructed picture. The SEI message for the FGS process such as the SEI message (701) may include a syntax element (e.g., the sample-based region flag or the alpha channel adaptation flag (711)) indicating that alpha channel information is used in the FGS process. In an aspect, the FGS process may be applied to the first sample based at least on the alpha channel information (e.g., indicated by or included in an alpha map). In an example, the FGS process based on the alpha channel information is not applied to a second sample in the reconstructed picture.

In an example, the alpha channel information indicates an alpha map such as described above including a third sample and a fourth sample. The first sample in the reconstructed picture and the third sample in the alpha map are spatially co-located, and the second sample in the reconstructed picture and the fourth sample in the alpha map are spatially co-located. The FGS process may be applied to the first sample based on a value of the third sample in the alpha map, and the FGS process is not applied to the second sample based on a value of the fourth sample in the alpha map. The value of the fourth sample in the alpha map is different from the value of the third sample in the alpha map.

In some examples, different samples in the reconstructed picture may have different strengths of the film grain based on values of samples in the alpha map.

In an example, the syntax element indicating that alpha channel information is an alpha channel adaptation flag (e.g., the fge_alpha_channel_adaptation_flag (1111)), and the alpha channel adaptation flag includes a first value (e.g., a value of "1") when the alpha channel information is used in the FGS process.

In an example, the reconstructed picture includes a first region that includes the first sample, the SEI message (e.g., the SEI message (701)) includes spatial information of the first region (e.g., the i-th region specified by the syntax elements (1106)-(1109)) and a flag (e.g., the flag (1110) being "1") indicating that the film grain synthesis process is to be applied to the first region. The film grain synthesis process may be applied to the first sample based on the alpha channel information and when the flag indicates that the film grain synthesis process is applied to the first region. In an example, the first region is rectangular, and the spatial information indicates a location and a size of the first region such as described by the syntax elements (1106)-(1109).

In an example, the reconstructed picture includes a second region (e.g., a j-th region specified by the syntax elements (1106)-(1109) where i is different from j) that includes a second sample, the SEI message includes spatial information of the second region and a flag (e.g., the flag (1110) being "0") indicating that the film grain synthesis process is not applied to the second region, and the film grain synthesis process is not applied to the second sample.

In an example, the alpha channel information includes the ACI SEI message.

In an aspect, the coded picture including at least the first sample and the second sample are reconstructed. The coded picture is associated with a film grain characteristics SEI message such as specified in H.274 and a film grain characteristics extension SEI message (e.g., the SEI message (701)). In an example, the FGS may be applied to the first sample based at least on a first value in the film grain characteristics extension SEI message and is not applied to the second sample based on at least a second value in the film grain characteristics extension SEI message.

In an example, the application of the FGS to one or more rectangular regions including the first sample or the second sample is controlled.

In an example, the coded picture including at least the first sample and the second sample are reconstructed and an alpha map includes a third and a fourth sample. After the reconstruction, the first sample and the third sample are spatially co-located, and the second and fourth sample are spatially co-located. The coded picture may be associated with a film grain characteristics SEI message and a film grain and an alpha channel information SEI message. The FGS may be applied to the first sample based on a value of the third sample and not applied to the second sample based on a value of the fourth sample. The value of the third sample and the value of the fourth sample are different.

Figure 12:
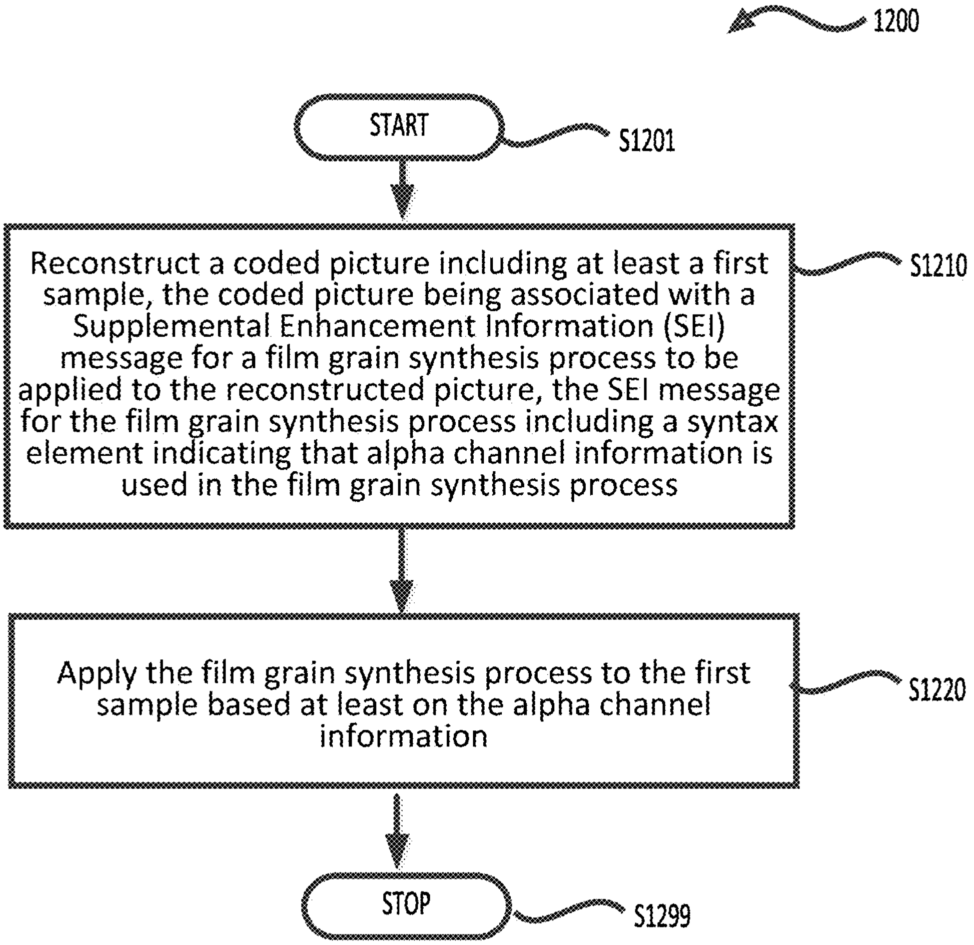
FIG. 12 shows a flow chart outlining a process according to an aspect of the disclosure.

FIG. 12 shows a flow chart outlining a process (1200) according to an aspect of the disclosure. The process (1200) can be used in a video decoder. In various aspects, the process (1200) is executed by processing circuitry, such as the processing circuitry that performs functions of the video decoder (210), the processing circuitry that performs functions of the video decoder (310), and the like. In some aspects, the process (1200) is implemented in software instructions, thus when the processing circuitry executes the software instructions, the processing circuitry performs the process (1200). The process starts at (S1201) and proceeds to (S1210).

At (S1210), a coded picture including at least a first sample is reconstructed. The coded picture is associated with a Supplemental Enhancement Information (SEI) message for a film grain synthesis process to be applied to the reconstructed picture. The SEI message for the film grain synthesis process includes a syntax element indicating that alpha channel information is used in the film grain synthesis process.

In an example, the syntax element is an alpha channel adaptation flag, and the alpha channel adaptation flag includes a first value when the alpha channel information is used in the film grain synthesis process.

In an example, the alpha channel information is an alpha channel information SEI message.

In an example, the first region is rectangular, and the spatial information indicates a location and a size of the first region.

At (S1220), the film grain synthesis process is applied to the first sample based at least on the alpha channel information.

In an example, the film grain synthesis process based on the alpha channel information is not applied to a second sample in the reconstructed picture.

Then, the process proceeds to (S1299) and terminates.

The process (1200) can be suitably adapted. Step(s) in the process (1200) can be modified and/or omitted. Additional step(s) can be added. Any suitable order of implementation can be used.

In an example, the reconstructed picture includes a second sample, and the alpha channel information indicates an alpha map including a third sample and a fourth sample. The first sample in the reconstructed picture and the third sample in the alpha map are spatially co-located, and the second sample in the reconstructed picture and the fourth sample in the alpha map are spatially co-located. The film grain synthesis process is applied to the first sample based on a value of the third sample in the alpha map, and the film grain synthesis process based on a value of the fourth sample in the alpha map is not applied to the second sample. The value of the fourth sample in the alpha map is different from the value of the third sample in the alpha map.

In an example, the reconstructed picture includes a first region that includes the first sample, the SEI message includes spatial information of the first region and a flag indicating that the film grain synthesis process is to be applied to the first region, and the film grain synthesis process is applied to the first sample based on the alpha channel information and when the flag indicates that the film grain synthesis process is applied to the first region.

In an example, the reconstructed picture includes a second region that includes a second sample, the SEI message includes spatial information of the second region and a flag indicating that the film grain synthesis process is not applied to the second region, and the film grain synthesis process is not applied to the second sample.

Figure 13:
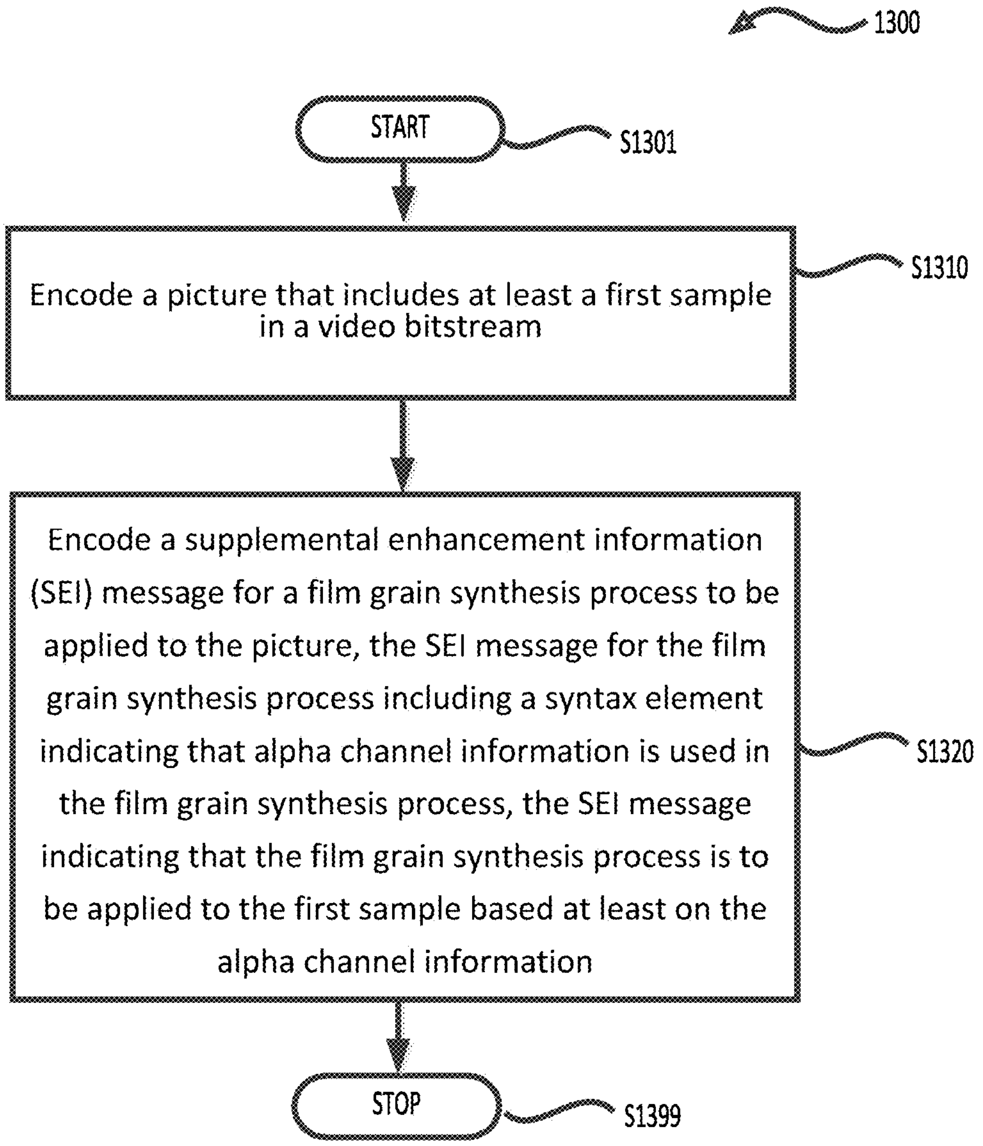
FIG. 13 shows a flow chart outlining a process according to an aspect of the disclosure.

FIG. 13 shows a flow chart outlining a process (1300) according to an aspect of the disclosure. The process (1300) can be used in a video encoder. In various aspects, the process (1300) is executed by processing circuitry, such as the processing circuitry that performs functions of the video encoder (203), the processing circuitry that performs functions of the video encoder (403), and the like. In some aspects, the process (1300) is implemented in software instructions, thus when the processing circuitry executes the software instructions, the processing circuitry performs the process (1300). The process starts at (S1301) and proceeds to (S1310).

At (S1310), a picture that includes at least a first sample is encoded in a video bitstream.

At (S1320), a supplemental enhancement information (SEI) message for a film grain synthesis process to be applied to the picture is encoded. The SEI message for the film grain synthesis process includes a syntax element indicating that alpha channel information is used in the film grain synthesis process. The SEI message indicates that the film grain synthesis process is to be applied to the first sample based at least on the alpha channel information Then, the process proceeds to (S1399) and terminates.

The process (1300) can be suitably adapted. Step(s) in the process (1300) can be modified and/or omitted. Additional step(s) can be added. Any suitable order of implementation can be used.

In an example, the SEI message indicates that the film grain synthesis process is not to be applied to a second sample in the picture based on the alpha channel information.

In an example, the picture includes a second sample, and the alpha channel information includes an alpha map. The alpha map includes a third sample and a fourth sample, the first sample in the picture and the third sample in the alpha map are spatially co-located, and the second sample in the picture and the fourth sample in the alpha map are spatially co-located. The film grain synthesis process is to be applied to the first sample based on a value of the third sample in the alpha map, and the film grain synthesis process based on a value of the fourth sample in the alpha map is not to be applied to the second sample. The value of the fourth sample in the alpha map is different from the value of the third sample in the alpha map.

In an example, the syntax element is an alpha channel adaptation flag, and a value of the alpha channel adaptation flag is a first value when the alpha channel information is used in the film grain synthesis process.

In an example, the picture includes a first region that includes the first sample, the SEI message includes spatial information of the first region and a flag indicating that the film grain synthesis process is to be applied to the first region, and the film grain synthesis process is to be applied to the first sample based on the alpha channel information and when the flag indicates that the film grain synthesis process is to be applied to the first region.

In an example, the first region is rectangular, and the spatial information indicates a location and a size of the first region.

In an example, the picture includes a second region that includes a second sample, the SEI message includes spatial information of the second region and a flag indicating that the film grain synthesis process is not to be applied to the second region, and the film grain synthesis process is not to be applied to the second sample.

In an example, the alpha channel information is an alpha channel information SEI message.

A method of processing visual media data is disclosed. The method may include processing a bitstream of the visual media data according to a format rule. The bitstream may include coded information of a coded picture including at least a first sample. The coded picture is associated with a Supplemental Enhancement Information (SEI) message for a film grain synthesis process to be applied to the coded picture that is reconstructed. The SEI message for the film grain synthesis process includes a syntax element indicating that alpha channel information is used in the film grain synthesis process. The format rule specifies that the film grain synthesis process is applied to the first sample based at least on the alpha channel information.

The techniques described above including techniques for SEI messages for the FGS can be implemented as computer software using computer-readable instructions and physically stored in one or more computer-readable media. For example, FIG. 14 shows a computer system (1400) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
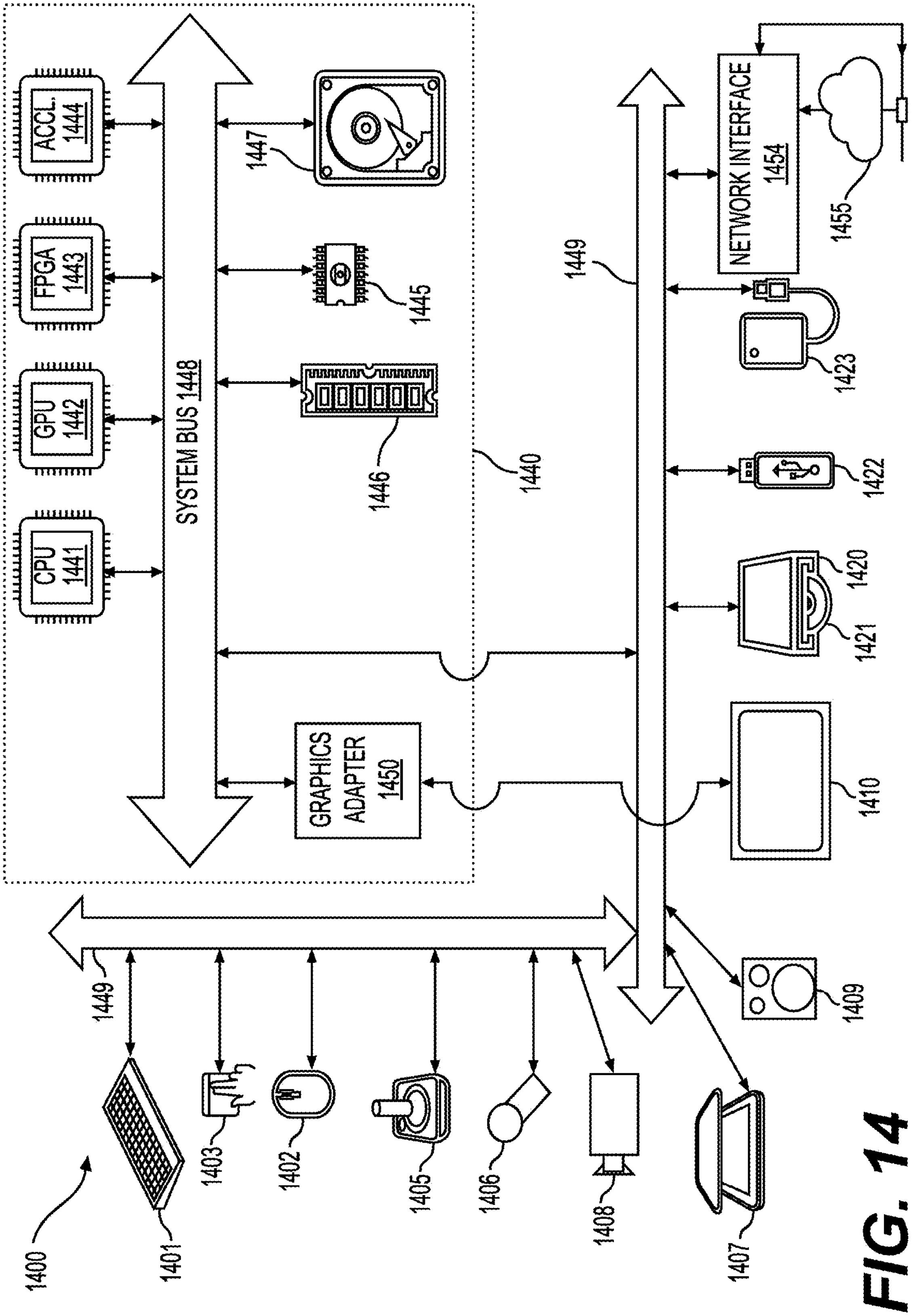
FIG. 14 is a schematic illustration of a computer system according to an aspect of the disclosure.

The components shown in FIG. 14 for computer system (1400) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bidirectional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various aspects of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video decoding, the method including: reconstructing a coded picture including at least a first sample, the coded picture being associated with a Supplemental Enhancement Information (SEI) message for a film grain synthesis process to be applied to the reconstructed picture, the SEI message for the film grain synthesis process including a syntax element indicating that alpha channel information is used in the film grain synthesis process; and applying the film grain synthesis process to the first sample based at least on the alpha channel information.

(2) The method of feature (1), in which the film grain synthesis process based on the alpha channel information is not applied to a second sample in the reconstructed picture.

(3) The method of feature (1), in which the reconstructed picture includes a second sample, the alpha channel information indicates an alpha map including a third sample and a fourth sample, the first sample in the reconstructed picture and the third sample in the alpha map being spatially co-located, and the second sample in the reconstructed picture and the fourth sample in the alpha map being spatially co-located, the applying the film grain synthesis process to the first sample includes applying the film grain synthesis process to the first sample based on a value of the third sample in the alpha map, and the film grain synthesis process based on a value of the fourth sample in the alpha map is not applied to the second sample, the value of the fourth sample in the alpha map being different from the value of the third sample in the alpha map.

(4) The method of any of features (1) to (3), in which the syntax element is an alpha channel adaptation flag, and the alpha channel adaptation flag includes a first value when the alpha channel information is used in the film grain synthesis process.

(5) The method of feature (1), in which the reconstructed picture includes a first region that includes the first sample, the SEI message includes spatial information of the first region and a flag indicating that the film grain synthesis process is to be applied to the first region, and the applying the film grain synthesis process includes applying the film grain synthesis process to the first sample based on the alpha channel information and when the flag indicates that the film grain synthesis process is applied to the first region.

(6) The method of any of features (1) to (5), in which the first region is rectangular, and the spatial information indicates a location and a size of the first region.

(7) The method of feature (1), in which the reconstructed picture includes a second region that includes a second sample, the SEI message includes spatial information of the second region and a flag indicating that the film grain synthesis process is not applied to the second region, and the film grain synthesis process is not applied to the second sample.

(8) The method of any of features (1) to (7), in which the alpha channel information is an alpha channel information SEI message.

(9) A method of video encoding, the method including: encoding a picture that includes at least a first sample in a video bitstream; and encoding a supplemental enhancement information (SEI) message for a film grain synthesis process to be applied to the picture, the SEI message for the film grain synthesis process including a syntax element indicating that alpha channel information is used in the film grain synthesis process, wherein the SEI message indicates that the film grain synthesis process is to be applied to the first sample based at least on the alpha channel information.

(10) The method of feature (9), in which the SEI message indicates that the film grain synthesis process is not to be applied to a second sample in the picture based on the alpha channel information.

(11) The method of feature (9), in which the picture includes a second sample, the alpha channel information includes an alpha map, the alpha map including a third sample and a fourth sample, the first sample in the picture and the third sample in the alpha map being spatially co-located, and the second sample in the picture and the fourth sample in the alpha map being spatially co-located, the film grain synthesis process is to be applied to the first sample based on a value of the third sample in the alpha map, and the film grain synthesis process based on a value of the fourth sample in the alpha map is not to be applied to the second sample, the value of the fourth sample in the alpha map being different from the value of the third sample in the alpha map.

(12) The method of any of features (9) to (11), in which the syntax element is an alpha channel adaptation flag, and a value of the alpha channel adaptation flag is a first value when the alpha channel information is used in the film grain synthesis process.

(13) The method of feature (9), in which the picture includes a first region that includes the first sample, the SEI message includes spatial information of the first region and a flag indicating that the film grain synthesis process is to be applied to the first region, and the film grain synthesis process is to be applied to the first sample based on the alpha channel information and when the flag indicates that the film grain synthesis process is to be applied to the first region.

(14) The method of any of features (9) to (13), in which the first region is rectangular, and the spatial information indicates a location and a size of the first region.

(15) The method of feature (9), in which the picture includes a second region that includes a second sample, the SEI message includes spatial information of the second region and a flag indicating that the film grain synthesis process is not to be applied to the second region, and the film grain synthesis process is not to be applied to the second sample.

(16) The method of any of features (9) to (15), in which the alpha channel information is an alpha channel information SEI message.

(17) A method of processing visual media data, the method including: processing a bitstream of the visual media data according to a format rule, wherein the bitstream includes coded information of a coded picture including at least a first sample, the coded picture being associated with a Supplemental Enhancement Information (SEI) message for a film grain synthesis process to be applied to the coded picture that is reconstructed, the SEI message for the film grain synthesis process including a syntax element indicating that alpha channel information is used in the film grain synthesis process; and the format rule specifies that the film grain synthesis process is applied to the first sample based at least on the alpha channel information

(18) The method of feature (17), in which the format rule specifies that the film grain synthesis process based on the alpha channel information is not applied to a second sample in the reconstructed picture.

(19) The method of feature (17), in which the reconstructed picture includes a second sample, the alpha channel information indicates an alpha map including a third sample and a fourth sample, the first sample in the reconstructed picture and the third sample in the alpha map being spatially co-located, and the second sample in the reconstructed picture and the fourth sample in the alpha map being spatially co-located, the format rule specifies that the film grain synthesis process is applied to the first sample based on a value of the third sample in the alpha map, and the format rule specifies that the film grain synthesis process based on a value of the fourth sample in the alpha map is not applied to the second sample, the value of the fourth sample in the alpha map being different from the value of the third sample in the alpha map.

(20) The method of any of features (17) to (19), in which the syntax element is an alpha channel adaptation flag, and the alpha channel adaptation flag includes a first value when the alpha channel information is used in the film grain synthesis process.

(21) An apparatus for video decoding, including processing circuitry that is configured to perform the method of any of features (1) to (8).

(22) An apparatus for video encoding, including processing circuitry that is configured to perform the method of any of features (9) to (16).

(23) A non-transitory computer-readable storage medium storing instructions which when executed by at least one processor cause the at least one processor to perform the method of any of features (1) to (20).

What is claimed is:

1. A method of video decoding, the method comprising:

reconstructing a coded picture including at least a first sample, the coded picture being associated with a Supplemental Enhancement Information (SEI) message for a film grain synthesis process to be applied to the reconstructed picture, the SEI message for the film grain synthesis process including a syntax element indicating that alpha channel information is used in the film grain synthesis process, the alpha channel information indicating an alpha map including a third sample, the first sample in the reconstructed picture and the third sample in the alpha map being spatially co-located; and applying the film grain synthesis process to the first sample based on a value of the third sample in the alpha map.

2. The method of claim 1, wherein the film grain synthesis process based on the alpha channel information is not applied to a second sample in the reconstructed picture.

3. The method of claim 1, wherein the reconstructed picture includes a second sample, the alpha map includes a fourth sample, the second sample in the reconstructed picture and the fourth sample in the alpha map being spatially co-located, and the film grain synthesis process based on a value of the fourth sample in the alpha map is not applied to the second sample, the value of the fourth sample in the alpha map being different from the value of the third sample in the alpha map.

4. The method of claim 1, wherein the syntax element is an alpha channel adaptation flag, and the alpha channel adaptation flag includes a first value when the alpha channel information is used in the film grain synthesis process.

5. The method of claim 1, wherein the reconstructed picture includes a first region that includes the first sample, the SEI message includes spatial information of the first region and a flag indicating that the film grain synthesis process is to be applied to the first region, and the applying the film grain synthesis process includes applying the film grain synthesis process to the first sample based on the value of the third sample in the alpha map and when the flag indicates that the film grain synthesis process is applied to the first region.

6. The method of claim 5, wherein the first region is rectangular, and the spatial information indicates a location and a size of the first region.

7. The method of claim 1, wherein the reconstructed picture includes a second region that includes a second sample, the SEI message includes spatial information of the second region and a flag indicating that the film grain synthesis process is not applied to the second region, and the film grain synthesis process is not applied to the second sample.

8. The method of claim 1, wherein the alpha channel information is an alpha channel information SEI message.

9. The method of claim 1, wherein a film grain map includes a fifth sample and a sixth sample, the first sample in the reconstructed picture and the fifth sample in the film grain map being spatially co-located, and the applying includes applying the film grain synthesis process to the first sample based on the value of the third sample in the alpha map and a value of the fifth sample in the film grain map.

10. The method of claim 9, wherein the SEI message includes a second syntax element, a value of the second syntax element indicating that the value of the third sample in the alpha map and the value of the fifth sample in the film grain map are multiplied.

11. The method of claim 1, wherein the value of the third sample in the alpha map indicates a strength of the film grain synthesis process applied to the first sample.

12. The method of claim 11, wherein different samples in the reconstructed picture have different strengths of the film grain synthesis process based on respective values of spatially co-located samples in the alpha map, the values of the spatially co-located samples including more than two different values.

13. A method of video encoding, comprising:

encoding a picture that includes at least a first sample in a video bitstream; and encoding a Supplemental Enhancement Information (SEI) message for a film grain synthesis process to be applied to the picture, the SEI message for the film grain synthesis process including a syntax element indicating that alpha channel information is used in the film grain synthesis process, the alpha channel information indicating an alpha map including a third sample, the first sample in the encoded picture and the third sample in the alpha map being spatially co-located, wherein the SEI message indicates that the film grain synthesis process is to be applied to the first sample based on a value of the third sample in the alpha map.

14. The method of claim 13, wherein the SEI message indicates that the film grain synthesis process is not to be applied to a second sample in the picture based on the alpha channel information.

15. The method of claim 13, wherein the picture includes a second sample, the alpha map includes a fourth sample, the second sample in the picture and the fourth sample in the alpha map being spatially co-located, and the film grain synthesis process based on a value of the fourth sample in the alpha map is not to be applied to the second sample, the value of the fourth sample in the alpha map being different from the value of the third sample in the alpha map.

16. The method of claim 13, wherein the syntax element is an alpha channel adaptation flag, and a value of the alpha channel adaptation flag is a first value when the alpha channel information is used in the film grain synthesis process.

17. The method of claim 13, wherein the picture includes a first region that includes the first sample, the SEI message includes spatial information of the first region and a flag indicating that the film grain synthesis process is to be applied to the first region, and the film grain synthesis process is to be applied to the first sample based on the value of the third sample in the alpha map and when the flag indicates that the film grain synthesis process is to be applied to the first region.

18. The method of claim 17, wherein the first region is rectangular, and the spatial information indicates a location and a size of the first region.

19. The method of claim 13, wherein the picture includes a second region that includes a second sample, the SEI message includes spatial information of the second region and a flag indicating that the film grain synthesis process is not to be applied to the second region, and the film grain synthesis process is not to be applied to the second sample.

20. A non-transitory computer-readable storage medium storing instructions which when executed by a processor cause the processor to perform a method of encoding a video bitstream comprising:

encoding a picture that includes at least a first sample in the video bitstream;

encoding a Supplemental Enhancement Information (SEI) message for a film grain synthesis process to be applied to the picture, the SEI message for the film grain synthesis process including a syntax element indicating that alpha channel information is used in the film grain synthesis process, the alpha channel information indicating an alpha map including a third sample, the first sample in the encoded picture and the third sample in the alpha map being spatially co-located; and transmitting the video bitstream, wherein the SEI message indicates that the film grain synthesis process is to be applied to the first sample based on a value of the third sample in the alpha map.

* * * * *